UNITED STATES PATENT OFFICE 2,022,921

AMINO AZO COMPOUND

Fritz Mietzsch, Wuppertal-Barmen, and Josef Klarer, Wuppertal-Elberfeld, Germany, assignors to Winthrop Chemical Company, Inc., New York, N. Y., a corporation of New York No Drawing. Application November 3, 1932, Serial No. 641,122. In Germany November 7, 1931

14 Claims. (Cl. 260—96)

The present invention relates to amino azo compounds of the following general formula:

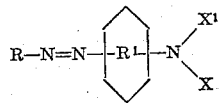

wherein R represents an aromatic or heterocyclic or aromatic-heterocyclic radical which may be substituted as, for instance, by halogen, alkyl or alkoxy groups, X stands for a basic radical which may contain one or more nitrogen atoms and may be substituted as, for instance, by free hydroxyl groups or by hydroxyl groups closed in an ether-like manner, or be interrupted by nitrogen, oxygen or sulfur atoms and contain isocyclic and heterocyclic radicals in any desired combination, $X^1$ represents hydrogen or alkyl, and wherein the benzene nucleus $R^1$ may be further more substituted as, for instance, by halogen, alkyl or alkoxy.

The said compounds are valuable technical products; they have proved to be particularly valuable in the therapeutic application against protozoa and bacteria.

More particularly our invention relates to the new compounds of the following general formula:

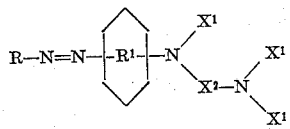

wherein R and $R^1$ represent the same as defined above, $X^1$ stands for hydrogen or alkyl and $X^2$ represents divalent aliphatic hydrocarbon group which may be substituted as, for instance, by hydroxyl. In the therapeutic application of compounds of this group such products have proved to be particularly valuable, as contain in the secondary or tertiary amine group of the benzene nucleus an aliphatic radical carrying a primary or tertiary amino group and in general are substituted one or more times by halogen, alkoxy or alkyl groups.

The said new compounds are obtainable by coupling aromatic, heterocyclic or aromatic-heterocyclic diazo compounds with amines of the benzene series, substituted in one amino group by a basic radical and capable of coupling or by causing diazo compounds of aminobenzene derivatives containing attached to one amino group a basic substituent to react with aromatic, heterocyclic or aromatic-heterocyclic compounds capable of coupling. Or aromatic, heterocyclic or aromatic-heterocyclic nitroso compounds are condensed with polyaminobenzenes, containing a primary reactive amino group as well as one amino group substituted by the basic radical or aromatic, heterocyclic or aromatic-heterocyclic amines can be caused to react with C-nitroso benzenes containing an amino group substituted by a basic radical.

Alternatively azoaminobenzene compounds containing one primary or secondary amino group in a benzene nucleus can be substituted in one amino group by a basic radical by the action of esters of amino alcohols, such as for example the halides or arylsulfonic acid esters. Furthermore azoaminobenzene compounds in which the amino group present in the benzene nucleus is substituted by a radical containing a replaceable group are treated in the manner that the replaceable substituent is displaced by ammonia or a primary or secondary amine. Finally a substituent, capable of again being readily split off, for example, an acyl radical is first introduced into the amino group of the component to be reacted upon and the said substituent is split off after condensation has been effected.

For example, in the diazo coupling and the nitroso condensation, N-acylaminoalkyl-aminobenzene compounds or N-amino-alkyl-acylaminobenzene compounds can be employed as starting materials, in which acyl represents the radical of a mono- or poly-basic organic acid, a sulfo group or an aryl sulfo group. When introducing a basic radical into an aminobenzene already containing the azo group N-acyl derivatives of aminoazo compounds or N-halogenalkylacylamides can be employed as the starting materials. In all cases the replaceable substituent of the amino group is finally removed in the customary manner.

The invention is further illustrated by the following examples without being restricted thereto:

*Example 1*

12.75 grams of 4-chloroaniline are dissolved in changes towards yellow with caustic soda lye), the 2-methyl-4'-iodo-compound (melting point 124° C., hygroscopic brown powder), the 2,2'-dichloro-4'-methyl-compound (melting point 114° C., brick colored prisms, solution color as in the case of the preceding compounds), the 2-chloro-4'-isooctyloxy compound (m. p. 112° C.), the 2-chloro-4'-dodecyloxy compound (m. p. 126° C.), the 2,2'-dimethyl-4'-chloro-compound (melting point 119° C., ochre colored crystal powder, solution color as before), the 3',5'-dimethyl-compound, (melting point 120° C., reddish brown needles, solution color as in the case above), the 3',5'-dichloro-compound (melting point 123° C., brick colored crystals, solution color as in the case of the preceding compounds), the 3',5'-diiodo-compound (melting point 122° C., brick red crystals, the orange colored aqueous solution becomes reddish violet with mineral acids), the 2,4'-diiodo-compound (melting point 128° C., dark brown crystal powder, yielding an orange or reddish violet solution), the 2,3',5'-triiodo-compound (melting point over 300° C., red crystal powder, yielding an orange red solution in water, which becomes reddish violet with mineral acids).

*Example 4*

12.75 grams of 4-chloro-aniline are diazotized in the manner described above and combined with 25 grams of N-ethyl-N-(gamma-diethyl-amino - beta - hydroxy - alpha - propyl) - aniline, (compare the process of German Patent No. 473,219, in particular Example 4) in 75 ccs. of glacial acetic acid. The reddish brown hydrochloride of the resulting 4'-chloro-4-(gamma-diethylamino-beta-hydroxy-alpha - propylethyl - amino)-azobenzene of the formula:

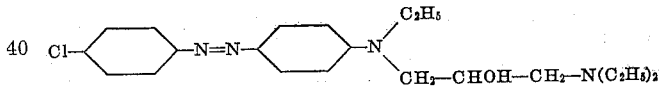

melts at 113° C. and dissolves in water with a yellowish red coloration, which becomes violet with excess of mineral acids.

In a corresponding manner the hydrochloride of 2,4'-dichloro-4-(gamma-diethylamino - beta - hydroxy-alpha-propylamino)-azobenzene is obtained by coupling 4-chloro-diazobenzene with 3 - chloro - N - (gamma - diethylamino - beta-hydroxy-alpha-propyl)-aniline.

The aniline derivative employed as intermediate product is obtained as a viscous oil, boiling at 194° C. under 2 mm. pressure, by heating 3-chloro-aniline for several hours with diethylamino-epihydrin in xylene.

In an analogous manner can be obtained the hydrochlorides of 4'-chloro-4-(alpha-diallylamino-gamma-butylamino)-azobenzene and of 4'-chloro-4-(alpha-dibutylamino-gamma-butylamino)-azobenzene.

*Example 5*

12.75 grams of 4-chloro-aniline are diazotized in the manner described above and 13.6 grams of N-(beta-aminoethyl)-aniline, (Gabriel, Berichte 22, (1889), page 2224) added in 50 ccs. of 30% acetic acid. After prolonged standing the reaction mixture is diluted with water, neutralized with sodium acetate and salted out. The hydrochloride of the resulting 4'-chloro-4-(beta-aminoethylamino)-azobenzene of the formula:

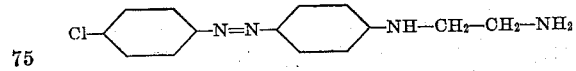

is obtained from alcohol as yellow crystals, melting at 210° C. and dissolving in water with rather more difficulty than the compounds described above. The solution is yellow and neutral to Congo. With excess of mineral acid it becomes red in color.

In the same manner when proceeding from the corresponding starting materials there are obtained the hydrochlorides of 4'-chloro-4-(gamma-methylamino-beta-hydroxy-alpha-propylethylamino)-azobenzene (reddish brown needles, melting at 126° C., which dissolve in water to give a yellowish red solution and becoming violet with excess of dilute mineral acid), the 4' - chloro - 4 - (gamma - piperidyl-beta-hydroxy-alpha - propylethylamino) - azobenzene (melting at 143° C., yellowish red prisms, yielding a yellowish red aqueous solution, becoming cherry red in mineral acid), the 4'-chloro-4-(beta-guanidinoethyl-methylamino)-azobenzene (melting at 217° C., brick red prisms, more difficultly soluble in water than the preceding compounds), the 3',5'-dichloro - 4 -(gamma-amino-beta-hydroxy-alpha-propylamino)-azobenzene (brown needles, which become red at 130° C. and melt at 190° C.; they dissolve in water to give a yellow solution and are precipitated from the solution by the addition of a small quantity of hydrochloric acid), the 3',5'-dichloro-4-(gamma-amino-beta-hydroxy - alpha-propylethyl-amino) - azobenzene (melting at 134° C., light brown needles arranged in clusters, which dissolve in water to give a yellow solution and a cherry red solution with dilute mineral acids), the 4'-chloro-4-(beta-acetamide) - amino - ethylmethylamino) - azobenzene (melting at 174° C., dark brown crystals), the 3',4',5'- trichloro-4-(gamma - amino - beta - hy - droxy - alpha - propylethyl - amino) - azobenzene (vermilion colored needles, melting at 179° C., yielding an orange colored aqueous solution and a cherry red solution with dilute acids), the 4'-methoxy-4-(gamma-amino-beta-hydroxy-alpha-propyl-ethylamino)-azobenzene (melting at 120° C., dark reddish brown colored crystal powder, which dissolves in water to give a reddish brown solution and an intense violet colored solution with dilute mineral acids), the 2-methyl-4'-iodo-4-(gamma-amino-beta-hydroxy - alpha - propylethylamino)-azobenzene, (melting at 198° C., cherry red solution in water, and a reddish violet solution in mineral acids), the 4'-arsenious oxide-4-(gamma-amino-beta-hydroxy - alpha - propylmethylamino)-azobenzene (melting at 174° C., cherry red solution in water and a violet solution in mineral acids or a yellow solution in caustic alkalies), the 3',5'- diiodo - 4 - (gamma - amino-beta-hydroxy-alpha-propylethylamino) - azobenzene (melting at 190° C., dissolves with rather more difficulty in water and mineral acids cause the yellowish red color to change towards violet whereby the dyestuff-salt is precipitated), the 2-methyl - 4 - decyloxy-(gamma-amino-beta-hydroxy - alpha - propylethylamino) - azobenzene, (melting point 156° C.), the 2-methyl-4'-sulfamido-(gamma-amino-beta-hydroxy-alpha-propylethylamino)-azobenzene, (melting point 212° C.).

*Example 6*

10.7 grams of 4-toluidine are boiled for a short time in 100 ccs. of glacial acetic acid with 27.2 grams of the hydrochloride of 4-nitroso-1-(N-methyl-diethylaminoethylamino)-benzene (compare German Patent No. 499,826, Example 6). The reaction mixture is mixed with ice, rendered alkaline and the resulting 4'-methyl-4-(diethylaminoethyl - methylamino) - azobenzene of the formula:

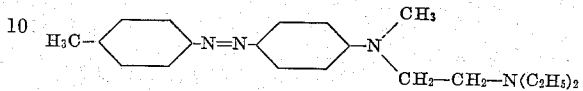

is obtained in the manner described above by extracting with ether.

The same compound is produced by boiling 12.1 grams of 4-nitroso toluene (compare Berichte 28, (1895), page 1220) in 100 ccs. of glacial acetic acid with 22.1 grams of 4-amino-1-(N-methyl-diethylamino - ethylamino) - benzene (compare German Patent No. 499,826, Example 6) and separating the azo compound by means of alkali.

A m-aminoazo compound is obtained by condensing 3 - amino-1-(diethylaminoethylamino)-benzene (compare German Patent No. 499,826, Example 5) with 4-chloro-1-nitroso-benzene.

Example 7

29.9 grams of the sodium salt of azobenzene-4-sulfaminic acid are dissolved in 100 ccs. of normal caustic soda lye and 14 grams of diethylaminoethyl chloride are added. Boiling is effected with stirring for some time. Hydrochloric acid is then added until the mixture is acid to Congo and boiling is continued for a further 15 minutes. The resulting 4-diethylaminoethylamino-azobenzene remains in solution with a red coloration, while any unchanged aminoazobenzene precipitates in the form of the difficultly soluble hydrochloric acid salt and can be separated readily. The filtered solution is rendered alkaline, extracted with ether, the ether is evaporated, the azo compound treated for a short time with steam, again taken up with ether, dried and precipitated by means of hydrogen chloride as the reddish violet hygroscopic hydrochloride.

The sodium salt of azo-benzene-4-sulfaminic acid (obtained from water in the form of large golden yellow platelets) is obtained by the addition of chlorosulfonic acid to pyridine and subsequent heating with 4-aminoazobenzene.

The 4-diethylaminoethylaminoazobenzene can also be obtained by heating 19.7 grams of 4-aminoazobenzene for several hours at 110° C. with 14 grams of diethylaminoethylchloride. The melt is extracted with dilute hydrochloric acid, filtered from undecomposed aminoazobenzene and worked up in the manner described above.

Example 8

12.75 grams of 4-chloro-aniline are diazotized in the customary manner and coupled in glacial acetic acid with 19.2 grams of acetylamino-ethyl-methylaminobenzene (melting at 92° C.). On the addition of sodium acetate the hydrochloride precipitates in the form of yellow crystals, which are filtered by suction, crystallized from glacial acetic acid and the resulting product is saponified by boiling for 2 hours with 200 ccs. of 10% hydrochloric acid. After working up in the customary manner the hydrochloride of 4'-chloro-4-(beta - aminoethyl - methylamino)-azobenzene is obtained in the form of grey needles possessing a silky lustre, melting at 208° C. and dissolving in water to give a yellowish red coloration and a violet coloration with excess hydrochloric acid.

Example 9

For the manufacture of an ortho-aminoazo compound 12.75 grams of 4-chloro-aniline are, for example, diazotized in the customary manner and coupled with 27.8 grams of 3,4-dimethoxy-(gamma - diethyl - amino - beta-hydroxy-alpha-propylamino)-benzene (obtainable from 4-aminoveratrol and diethylaminoepihydrin, a liquid boiling at 209° C. at a pressure of 1.5 mm.). The resulting 4'-amino-3.4-dimethoxy-2-(gamma-diethylamino - beta-hydroxy-alpha-propylamino) - azobenzene crystallizes in dark red needles, melting at 133° C., which dissolve in water to give an orange coloration and a violet coloration in mineral acids.

Example 10

22.1 grams of 4-amino-(beta-diethylaminoethyl-methylamino)-benzene are dissolved in 90 grams of 90% sulfuric acid and cooled to 0° C. Then a quantity of nitrosyl sulfuric acid corresponding to 6.9 grams of sodium nitrite is gradually dropped in and after standing for a short time the mixture is added to ice. 11.0 grams of resorcinol are dissolved in water, mixed with ice and caustic soda lye and the diazo solution is added. The dyestuff forms at once. The solution is rendered neutral by means of hydrochloric acid and the dyestuff precipitates first as an oil, but becomes solid after standing for some time. It is filtered by suction and crystallized from a small quantity of alcohol. It then forms a brown crystal powder, which is readily soluble in water to give a yellowish brown solution and a reddish brown solution in caustic soda lye, while the solution in dilute hydrochloric acid is violet.

We claim:—

1. The compounds of the following general formula:

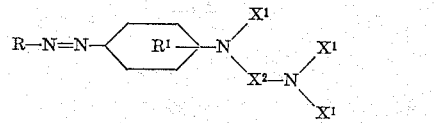

wherein R represents an aromatic radical, $X^1$ stands for hydrogen or alkyl, $X^2$ represents a divalent aliphatic hydrocarbon group which may be substituted by hydroxyl, and wherein the benzene nucleus $R^1$ may be furthermore substituted by alkyl, alkoxy or halogen.

2. The compounds of the following general formula:

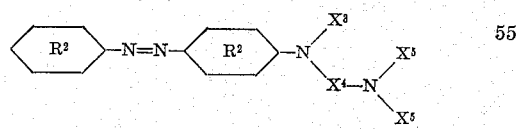

wherein at least one of the benzene nuclei $R^2$ is substituted by at least one halogen, alkoxy or alkyl group, $X^3$ represents hydrogen or alkyl, $X^4$ stands for a divalent aliphatic hydrocarbon group which may be substituted by hydroxyl, and wherein either of $X^5$'s stand for hydrogen or alkyl.

3. The compounds of the following general formula:

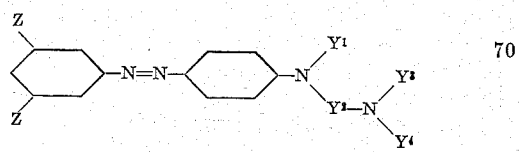

wherein Z represents halogen, alkyl or alkoxy, $Y^1$ stands for hydrogen or alkyl, $Y^2$ stands for a divalent aliphatic hydrocarbon group which may be substituted by hydroxyl, and wherein either $Y^3$ or $Y^4$ stand for hydrogen or alkyl.

4. The compounds of the following general formula:

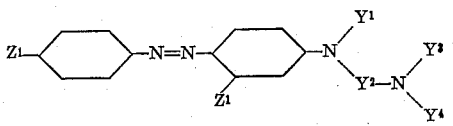

wherein $Z^1$ represents halogen, alkyl or alkoxy, $Y^1$ stands for hydrogen or alkyl, $Y^2$ stands for a divalent aliphatic hydrocarbon group which may be substituted by hydroxyl and wherein either $Y^3$ or $Y^4$ stand for hydrogen or alkyl.

5. The compounds of the general formula:

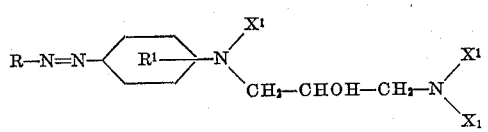

wherein R represents an aromatic radical, $X^1$ stands for hydrogen or alkyl, and wherein the benzene nucleus $R^1$ may be furthermore substituted by alkyl, alkoxy or halogen.

6. The compounds of the general formula:

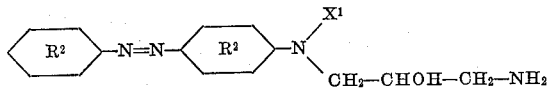

wherein at least one of the benzene nuclei $R^2$ is substituted by at least one halogen, alkoxy or alkyl group, and $X^1$ represents hydrogen or alkyl.

7. The compounds of the formula:

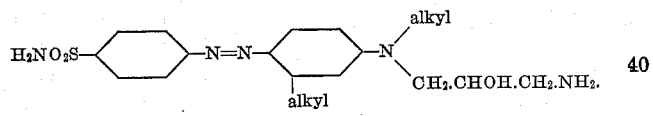

wherein Hal stands for a halogen atom, and $X^1$ stands for hydrogen or alkyl.

8. The compound of the formula:

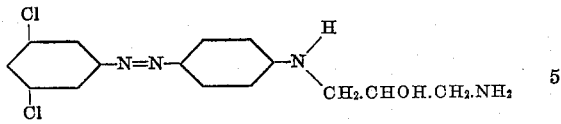

forming in the form of its hydrochloride brown needles which melt at 190° C. and dissolve in water to a yellow solution.

9. The compounds of the formula:

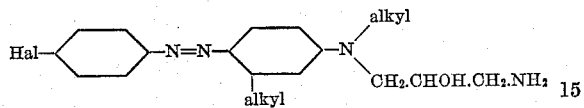

wherein Hal stands for a halogen atom.

10. The compound of the formula:

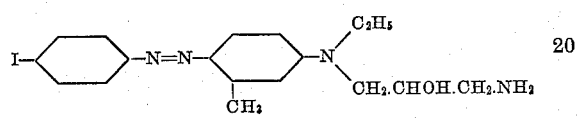

melting in the form of its hydrochloride at 198° C. and dissolving in water to a cherry red solution.

11. The compounds of the general formula:

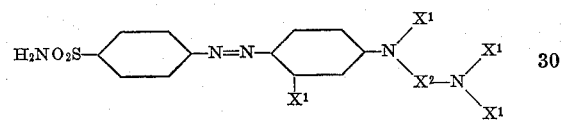

wherein $X^1$ stands for hydrogen or alkyl and $X^2$ stands for a divalent aliphatic hydrocarbon group which may be substituted by hydroxyl.

12. The compounds of the formula:

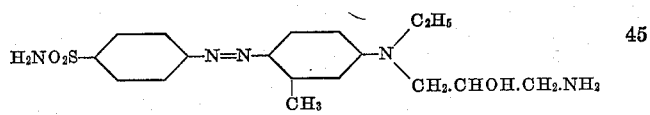

13. The compound of the formula:

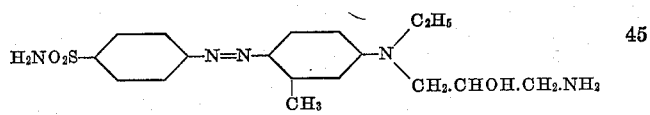

melting in the form of its hydrochloride at 212° C.

14. Azobenzene compounds in which one benzene nucleus is substituted by one aminoalkylamino- or alkylaminoalkylamino group.

FRITZ MIETZSCH.
JOSEF KLARER.